(12) United States Patent
Chen et al.

(10) Patent No.: US 8,338,969 B2
(45) Date of Patent: Dec. 25, 2012

(54) SERIAL ADVANCED TECHNOLOGY ATTACHMENT INTERFACE STORAGE DEVICE

(75) Inventors: I-An Chen, Hsinchu (TW); Wen-Chieh Lee, Hsinchu (TW)

(73) Assignee: Waltop International Corp., Hsinchu (TW)

( * ) Notice: Subject to any disclaimer, the term of this patent is extended or adjusted under 35 U.S.C. 154(b) by 306 days.

(21) Appl. No.: 12/694,564

(22) Filed: Jan. 27, 2010

(65) Prior Publication Data

US 2011/0029708 A1    Feb. 3, 2011

(30) Foreign Application Priority Data

Jul. 29, 2009 (TW) .............................. 98125497 A

(51) Int. Cl.
   *H01L 23/48* (2006.01)
(52) U.S. Cl. .................. 257/784; 257/E23.01
(58) Field of Classification Search .......... 257/690–697, 257/778, 780, 781, 784, 786, E23.001, 666, 257/686
   See application file for complete search history.

(56) References Cited

U.S. PATENT DOCUMENTS

| 6,979,890 B2 * | 12/2005 | Kambe et al. ................. 257/678 |
| 7,393,247 B1 | 7/2008 | Yu et al. |
| 8,097,933 B2 * | 1/2012 | Suh .............................. 257/666 |

OTHER PUBLICATIONS

Taiwan Office Action issued Sep. 24, 2012.

* cited by examiner

*Primary Examiner* — Hoa B Trinh
(74) *Attorney, Agent, or Firm* — McClure, Qualey & Rodack, LLP

(57) ABSTRACT

A serial advanced technology attachment (SATA) interface storage device. The SATA interface storage device can be used in cooperation with an electrical apparatus and comprises a substrate, a chip set, a SATA interface and a shell. The substrate has a first surface, a second surface corresponding to the first surface and a plurality of connectors between the first surface and the second surface. The chip set is disposed on the first surface. The SATA interface is disposed on the second surface and is electrically connected to the chip set via a part of the connectors so that the electrical apparatus may be electrically connected to the chip set via the SATA interface to access the chip set. The shell has a width and a thickness and defines a receiving space for receiving the substrate, the chip set and the SATA interface, where the width and the thickness conform to a micro-memory card standard.

4 Claims, 4 Drawing Sheets

SERIAL ADVANCED TECHNOLOGY ATTACHMENT INTERFACE STORAGE DEVICE

This application claims priority to Taiwan Patent Application No. 098125497 filed on Jul. 29, 2009.

CROSS-REFERENCES TO RELATED APPLICATIONS

Not applicable

BACKGROUND OF THE PRESENT INVENTION

1. Field of the present invention

The present invention relates to a serial advanced technology attachment (SATA) interface storage device. Specifically, the present invention relates to a SATA interface storage device with a shell that has a width and a thickness conforming to a micro-memory card standard.

2. Descriptions of the Related Art

Due to the advancement in science and technology, a wide variety of digital products are becoming increasingly popular, examples of which are digital cameras, mobile phones, notebook computers, personal computers, electronic books, etc. To allow users to carry various digital data in a more convenient way for use in these digital products, secure digital (SD) cards have emerged accordingly.

Featuring a compact volume and good portability, SD cards have found wide application in digital cameras, mobile phones, notebook computers, personal computers and electronic books for users to carry digital data such as video data, digital pictures, music and the like. However, as restricted by the standard formulated by the SD Card Association, SD cards may only be accessed at a low speed, and the limited capacity thereof has also restricted their application.

Accordingly, efforts still have to be made in the art to effectively improve both the accessing speed and capacity of SD cards while still preserving the original advantages of a compact volume and good portability.

SUMMARY OF THE PRESENT INVENTION

One objective of the present invention is to provide a serial advanced technology attachment (SATA) interface storage device. The SATA interface storage device, which is adapted to work with an electrical apparatus, comprises a substrate, a chip set, a SATA interface and a shell. The substrate has a first surface, a second surface corresponding to the first surface, and a plurality of connectors disposed between the first surface and the second surface. The chip set is disposed on the first surface. The SATA interface is disposed on the second surface of the substrate and electrically connected to the chip set via a part of the connectors so that the electrical apparatus may be electrically connected to the chip set via the SATA interface to access the chip set. The shell has a width and a thickness and defines a receiving space for receiving the substrate, the chip set and the SATA interface. The width and the thickness conform to a micro-memory card standard. For example, the micro-memory card standard may be one of a secure digital (SD) card standard, a micro SD card standard, a mini SD card standard, a SD Input-Output (IO) card standard, a smartmedia card standard, a xD-Picture card standard, a compact flash (CF) card standard, a multi-media card (MMC) standard, a reduced-size (RS) MMC card standard, a memory stick micro card standard, a memory stick duo card standard and a memory stick flash card standard.

According to the above descriptions, the SATA interface storage device of the present invention has not only outline dimensions conforming to a micro-memory card standard, but also an accessing speed and capacity conforming to the SATA standard. Therefore, as compared to conventional micro-memory cards, the SATA interface storage device of the present invention presents a significant improvement in both the accessing speed and capacity while still preserving the advantages of a compact volume and good portability. Consequently, with the present invention, shortcomings of slow speed and inadequate capacity of the conventional micro-memory cards are effectively obviated, thereby increasing the overall industrial value.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The present invention provides a serial advanced technology attachment (SATA) interface storage device that has a size conforming to a micro-memory card standard and is adapted to work with an electrical apparatus, e.g., a mobile phone, a personal digital assistant (PDA), a notebook computer, a card reader, etc. In the following descriptions, the present invention will be explained with reference to embodiments thereof. However, these embodiments are not intended to limit the present invention to any specific environment, applications or implementations described in these embodiments. Therefore, description of these embodiments is only for purpose of illustration rather than to limit the present invention. It should be appreciated that in the following embodiments and the attached drawings, elements unrelated to the present invention are omitted from depiction.

Figure 1A:
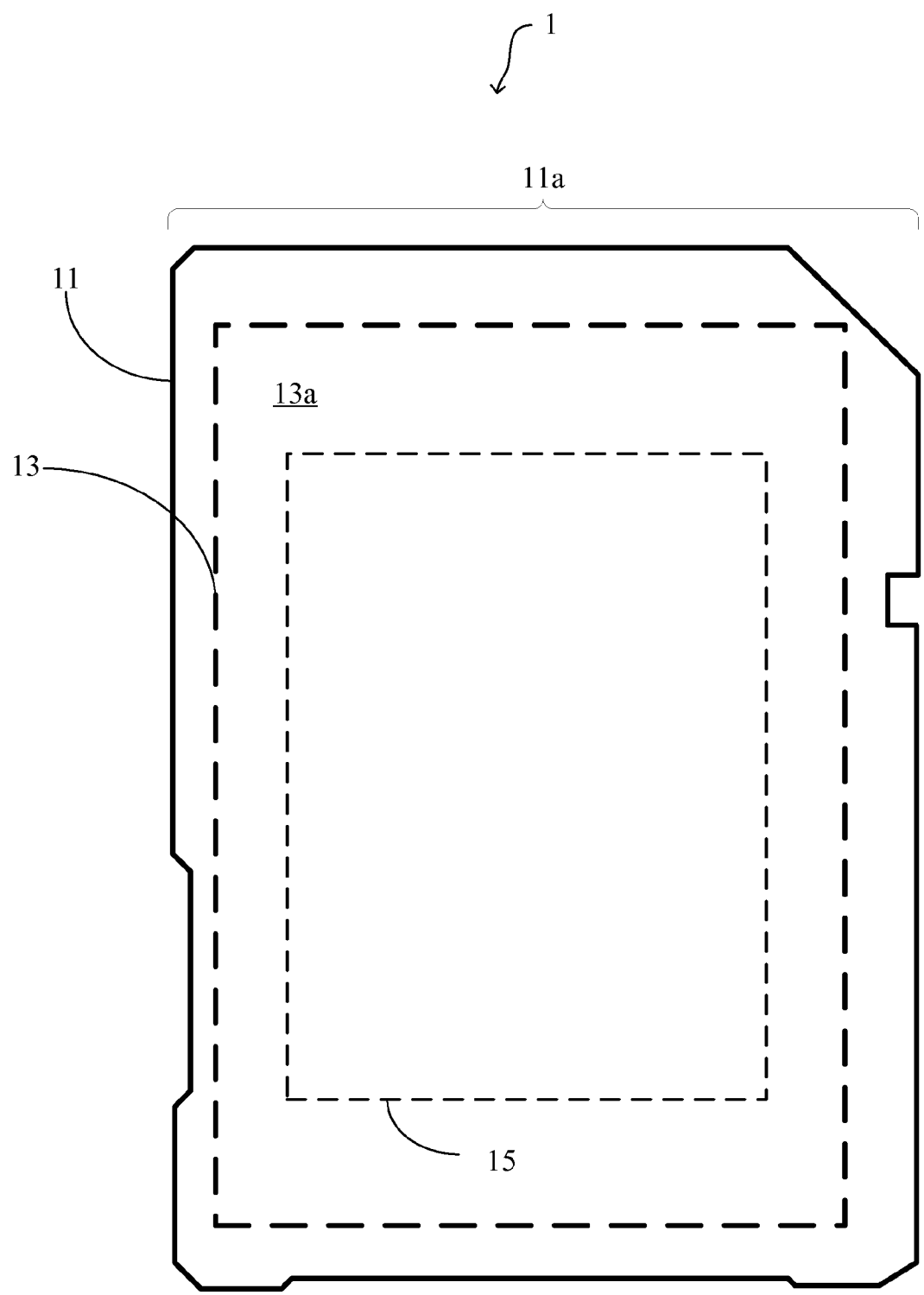
FIG. 1A is a top view from a front side according to a first embodiment of the present invention.
Figure 1B:
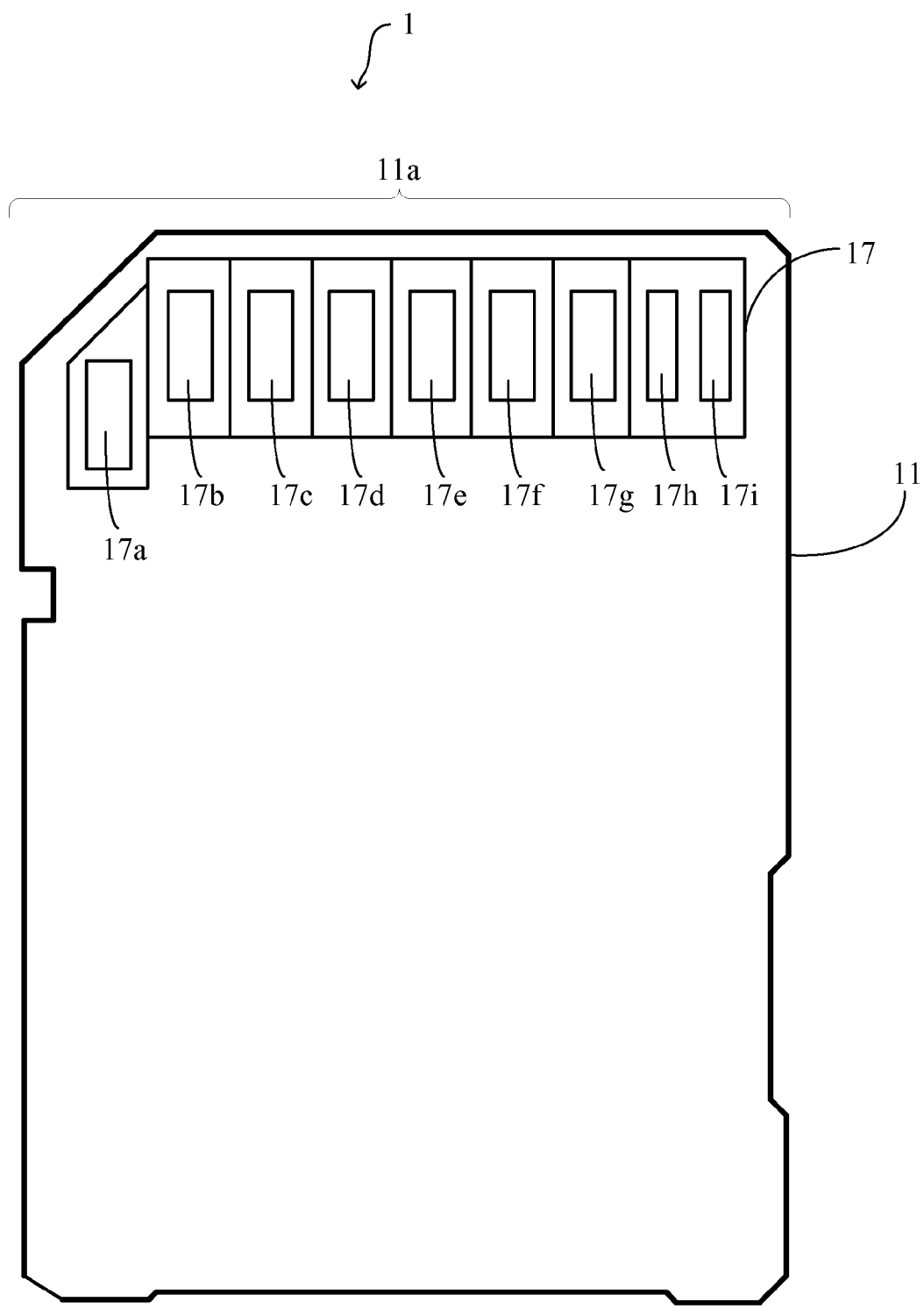
FIG. 1B is a top view from a back side according to the first embodiment of the present invention.
Figure 1C:
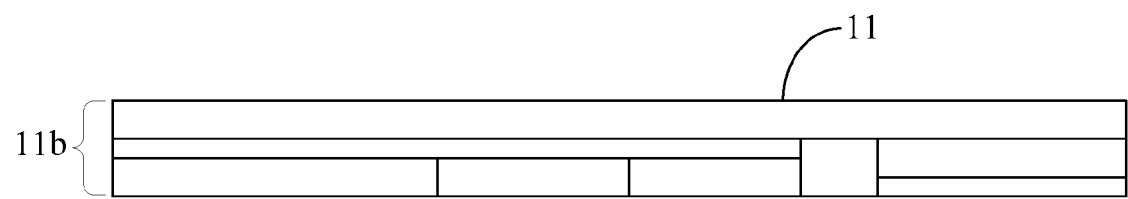
FIG. 1C is a side view according to the first embodiment of the present invention.

A first embodiment of the present invention is shown in FIGS. 1A-1C, which illustrate a top view from a front side, a top view from a back side, and a side view of a SATA interface storage device 1 of the present invention respectively. The SATA interface storage device 1 comprises a shell 11, a substrate 13, a chip set 15 and a SATA interface 17. The shell 11 of the SATA interface storage device 1 has a width 11a and a thickness 11b, and defines a receiving space for receiving the substrate 13, the chip set 15 and the SATA interface 17. It should be particularly noted that the width 11a and the thickness 11b of the shell 11 conform to a micro-memory card standard which, in this embodiment, is exemplified as a Secure Digital (SD) card standard. That is, the SATA interface storage device 1 has a width and a thickness that are identical to conventional SD cards to be received in a SD card slot of a mobile phone, a PDA, a notebook computer or a card reader. However, in other examples, the width 11a and the thickness 11b of the shell 11 of the SATA interface storage device 1 may also conform to one of a micro SD card standard, a mini SD card standard, a SD Input-Output (IO) card standard, a smart-media card standard, a xD-Picture card standard, a compact flash (CF) card standard, a multi-media card (MMC) standard, a reduced-size (RS) MMC card standard, a memory stick micro card standard, a memory stick duo card standard and a memory stick flash card standard. Furthermore Table 1 below shows the specifications of the aforesaid micro-memory card standards.

TABLE 1

| Micro-memory card standard | Width | Length | Thickness |
|---|---|---|---|
| SD card standard | 24 mm | 32 mm | 2.1 mm |
| Micro SD card standard | 11 mm | 15 mm | 1 mm |
| Mini SD card standard | 21.5 mm | 20 mm | 1.4 mm |
| SDIO card standard | 32 mm | 24 mm | 2.1 mm |
| SmartMedia card standard | 45 mm | 37 mm | 0.76 mm |
| xD-Picture card standard | 20 mm | 25 mm | 1.7 mm |
| CF card standard (Type I) | 36.4 mm | 42.8 mm | 3.3 mm |
| CF card standard (Type II) | 36.4 mm | 42.8 mm | 5 mm |
| MMC standard | 32 mm | 24 mm | 1.4 mm |
| RS MMC standard | 24 mm | 16 mm | 1.4 mm |
| Memory stick micro card standard | 15 mm | 12.5 mm | 1.2 mm |
| memory stick duo card standard | 31 mm | 20 mm | 1.6 mm |
| memory stick flash card standard | 50 mm | 21.5 mm | 2.8 mm |

In reference to FIG. 1A, the substrate 13 has a first surface 13a, a second surface (not shown) corresponding to the first surface 13a, and a plurality of connectors (not shown) disposed between the first surface 13a and the second surface for electrical connection therebetween. The chip set 15 is disposed on the first surface 13a. In further reference to FIG. 1B, the SATA interface 17 is disposed on the second surface of the substrate 13 and electrically connected to the chip set 15 via a part of the connectors so that the electrical apparatus may be electrically connected to the chip set 15 via the SATA interface 17 to access the chip set 15. In more detail, the connectors include at least nine SATA interface connectors 17a-17i. The input/output (I/O) signals corresponding to the nine SATA interface connectors 17a-17i are listed in Table 2:

TABLE 2

| Corresponding signals | SATA interface connector |
|---|---|
| TXN | 17a |
| TXP | 17b |
| GNDA | 17c, 17d |
| VDD | 17e |
| VCCK | 17f |
| GNDD | 17g |
| RXN | 17h |
| RXP | 17i |

As shown in Table 2, the TXN connector 17a functions as a negative electrode for SATA signal transmission, the TXP connector 17b functions as a positive electrode for SATA signal transmission, the GNDA connectors 17c and 17d function as an analog ground, the VDD connector 17e is configured to supply a 3.3V voltage, the VCCK connector 17f is configured to supply a 1.8V voltage, the GNDD connector 17g functions as a digital ground, the RXN connector 17h functions as a negative electrode for SATA signal receipt, and the RXP connector 17i functions as a positive electrode for SATA signal receipt. It should be appreciated that, positional arrangement of the nine SATA interface connectors in this embodiment is only provided as an example, and in other embodiments, the nine SATA interface connectors may also be arranged in other manners instead of being limited thereto.

Additionally, the number of any of the nine SATA interface connectors may also be increased upon the practical design and, therefore, the number of the SATA interface connectors is not intended to limit the present invention.

Figure 2:
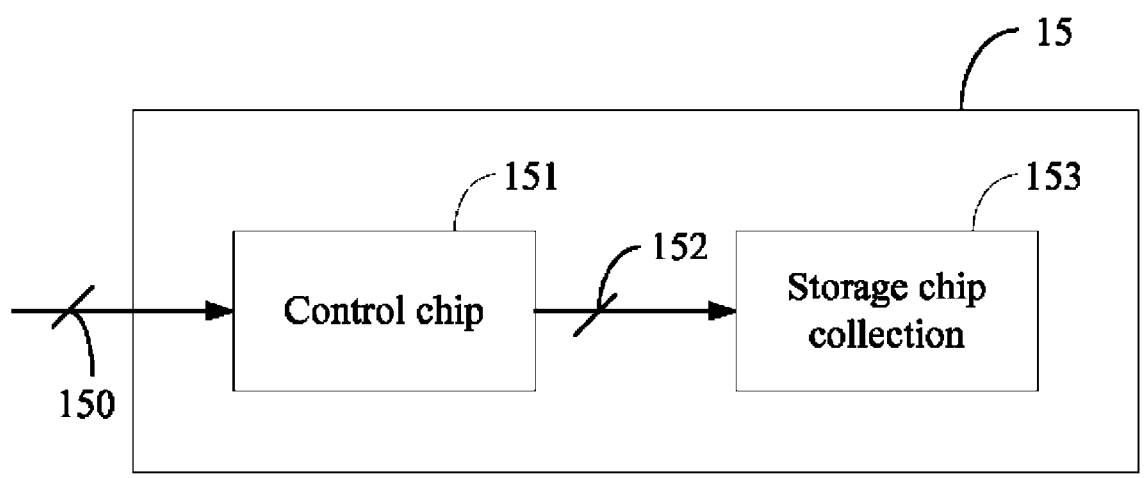
FIG. 2 is a schematic view of a chip set according to the first embodiment of the present invention.

In reference to FIG. 2, a schematic view of the chip set 15 is shown therein. The chip set 15 comprises a control chip 151 and a storage chip collection 153. The electrical apparatus may be electrically connected to the control chip 151 of the chip set 15 via the SATA interface connectors 17a-17i to access the storage chip collection 153 of the chip set 15. Specifically, the electrical apparatus is adapted to transmit a control signal 150, which may be one or a combination of the control signals listed in Table 2, to the chip set 15 so that the control chip 151 may generate an access signal 152 to the storage chip collection 153 according to the control signal 150. Then the storage chip collection 153 operates according to the access signal 152 so that the electrical apparatus may access the storage chip collection 153.

According to the above descriptions, the SATA interface storage device of the present invention has not only outline dimensions conforming to a micro-memory card standard (e.g., the SD card standard), but also an accessing speed and capacity conforming to the SATA standard. Therefore, as compared to conventional micro-memory cards, the SATA interface storage device of the present invention presents a significant improvement in both the accessing speed and capacity while still preserving the advantages of a compact volume and good portability. Consequently, with the present invention, shortcomings of a slow speed and inadequate capacity of the conventional micro-memory cards are effectively obviated, thereby increasing the overall industrial value.

The above disclosure is related to the detailed technical contents and inventive features thereof. People skilled in this field may proceed with a variety of modifications and replacements based on the disclosures and suggestions of the present invention as described without departing from the characteristics thereof. Nevertheless, although such modifications and replacements are not fully disclosed in the above descriptions, they have substantially been covered in the following claims as appended.

What is claimed is:

1. A serial advanced technology attachment (SATA) interface storage device, being adapted to work with an electrical apparatus, comprising:
   a substrate, having a first surface, a second surface corresponding to the first surface, and a plurality of connectors disposed between the first surface and the second surface;
   a chip set, disposed on the first surface, the chip set comprising a control chip and a storage chip collection, wherein the plurality of connectors electrically connect the control chip to the storage chip collection, the control chip generates an access signal to the storage chip collection;
   a SATA interface, disposed on the second surface of the substrate and electrically connected to the chip set via a part of the connectors so that the electrical apparatus may be electrically connected to the chip set via the SATA interface to access the chip set; and
   a shell, having a width and a thickness and defining a receiving space for receiving the substrate, the chip set and the SATA interface, characterized in that the width and the thickness conform to a micro-memory card standard.

2. The SATA interface storage device as claimed in claim 1, wherein the connectors comprise at least nine SATA interface connectors so that the electrical apparatus may be electrically connected to the chip set via the at least nine SATA interface connectors to access the chip set.

3. The SATA interface storage device as claimed in claim 2, wherein the at least nine SATA interface connectors comprise:
- a SATA signal transmission positive connector;
- two analog ground connectors;
- a digital ground connector;
- a supply voltage 3.3 v connector;
- a supply voltage 1.8 v connector;
- a SATA signal receipt negative connector;
- a SATA signal receipt positive connector; and
- a SATA signal transmission negative connector;
- wherein the electrical apparatus may be electrically connected to the chip set via the SATA signal transmission positive connector, the two analog ground connectors, the digital ground connector, the supply voltage 3.3 v connector, the supply voltage 1.8 v connector, the SATA signal receipt negative connector, the SATA signal receipt positive connector and the SATA signal transmission negative connector to access the chip set.

4. The SATA interface storage device as claimed in claim 1, wherein the micro-memory card standard is one of a secure digital (SD) card standard, a micro SD card standard, a mini SD card standard, a SD Input-Output (IO) card standard, a smartmedia card standard, a xD-Picture card standard, a compact flash (CF) card standard, a multi-media card (MMC) standard, a reduced-size (RS) MMC card standard, a memory stick micro card standard, a memory stick duo card standard and a memory stick flash card standard.

* * * * *